Nov. 22, 1927.

Re. 16,798

H. E. MARKS

ROOF STRUCTURE

Original Filed Aug. 31, 1920

INVENTOR
Herbert E. Marks
BY
Connie Doris Marvin & Edmonds
ATTORNEYS

Reissued Nov. 22, 1927.

Re. 16,798

UNITED STATES PATENT OFFICE.

HERBERT E. MARKS, OF GLEN OSBORNE, PENNSYLVANIA.

ROOF STRUCTURE.

Original No. 1,398,079, dated November 22, 1921, Serial No. 407,189, filed August 31, 1920. Divided and this application for reissue filed January 2, 1926. Serial No. 79,058.

This invention relates to roof structures. Its object is to provide a roof structure which is fire-proof, which forms an efficient heat insulator, which is light in weight, low in cost, which can be easily and cheaply erected, and which, nevertheless, is strong and durable. This application constitutes a divisional reissue application based on my reissue application Serial No. 62,677, filed October 15, 1925, for the reissue of Letters Patent No. 1,398,079.

Generally stated, the invention comprises a roof structure containing metallic angle members and a substantially monolithic and reinforced slab of gypsum or similar material, combined and assembled in the novel way hereinafter described.

Figure 1:
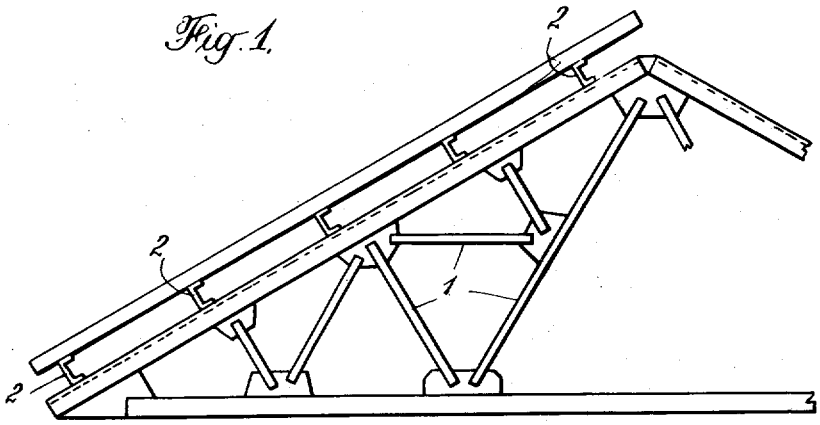
Figure 3:
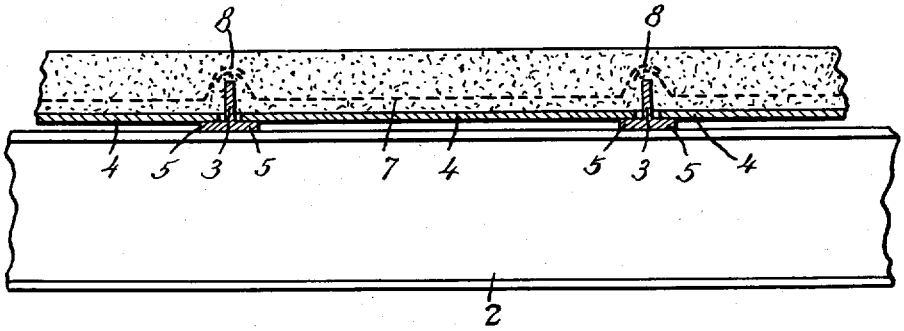
Figure 2:
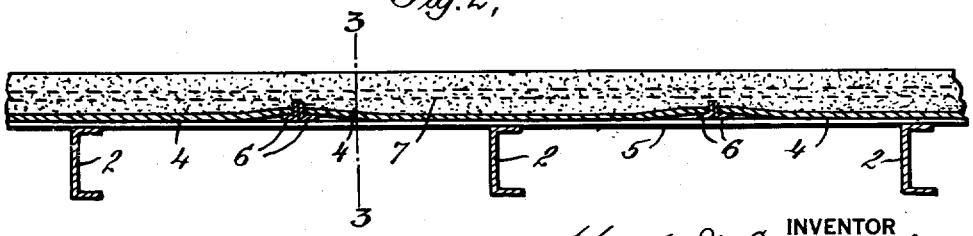

In the accompanying drawings Figure 1 is a vertical section of an inclined roof constructed in accordance with the invention; Figure 2 shows a portion of Figure 1 on an enlarged scale; and Figure 3 is a section taken on line 3, 3 of Figure 2 on a still larger scale.

The invention is applicable to a roof of any type, and in the drawings is shown as applied in a double sloping or ridge roof. In the drawings 1 indicates a suitable frame truss or part of the building on which the roof is supported and 2 indicates purlins for supporting the roof structure proper. All of these parts are illustrated as formed of structural steel, and obviously can be of any material, character or design, depending upon the kind and size of the roof.

The roof structure proper comprises a plurality of angle bars, specifically of the type known as T-bars, 3, which rest with their base flanges upon the purlins and are suitably secured thereto and with their legs projecting upwardly. These T-bars form the base for the roof structure proper and will be spaced sufficiently close that the distance therein can be bridged by ordinary sizes of plaster or gypsum boards, which are articles of commercial manufacture and sale, being generally composed of molded gypsum or the like, and generally are quite thin, usually about three-eighths of an inch in thickness. The plaster or gypsum boards are shown at 4, having their side edges resting upon and supported by the horizontal flanges 5 of the T-bars 3, as shown in Fig. 3. These gypsum boards can be chosen of any suitable length, but preferably of a length substantially equal to the space between adjacent purlins 2, but instead of extending from purlin to purlin they are so placed that their central portions are substantially above purlins, with their end portions meeting about midway between adjacent purlins. To support the end portions of these plaster boards it is preferred to use small angle members 6, of a length equal to the distance between adjacent T-bars 3, and having their ends resting upon the flanges 5 of said T-bars, as a result of which the thin plaster boards are supported not only at their side edges but also at their end edges. Obviously in lieu of the T-bars 3, a pair of angle bars or channels placed back to back may be utilized, and likewise instead of the angle bars 6 placed back to back as shown, small T-bars or channels may be used.

The plaster boards 4, placed in the manner described, serve as centering for the formation of the roof slab, and also as the lower facing of the roof slab. The roof slab is formed from suitable cementitious material, such as gypsum, which is mixed with the proper proportion of water and then molded directly in place, that is, by being poured upon the centering formed by the plaster boards 4. The composition of this cementitious material is preferably the same as that of the plaster boards but in any event is of such nature that when poured in place it bonds onto the plaster boards so that the latter and the solidified cementitious material form a unitary or monolithic slab.

Preferably this slab will be reinforced by embedding in the cementitious material suitable metallic reinforcement 7, preferably a metallic mesh, such as metallic lath, wire mesh, or the like. This metallic reinforcement may be in the form of sheets extending across, and resting upon the upper edges of the angle bars 6 and being supported by the latter and thereby properly spaced from the plaster boards 4,—the upward projection of the angle bars 6 preferably being somewhat greater than the thickness of the plaster boards, but terminating below the center of the upwardly projecting leg of the T-bars, so that the metal reinforcement will be embedded close to the lower face of the slab. This metallic mesh will be either one continuous strip extending from the eaves to the ridge of the roof, or may be composed of a number of pieces, the ends of which are overlapped so that when embedded in the cementitious material it has the same reinforcing effect as though a continuous strip of material were used; also if desired, the edge portions of the metallic reinforcement may be bent upwardly and made to overlap the upper edges of the T bars 3, as shown at 8, Fig. 3, so as to also secure a continuous, additional transverse tie; or the strips of reinforcement may run across the T bars 3, and bend down between the T-bars, with their edges overlapping to give in effect a continuous reinforcement, when embedded in the cementitious material, from eave to ridge and also transversely of the roof. The cementitious material which is poured onto the centering plaster boards 4 readily passes through this metal mesh and bonds to the plaster boards. Such material will be filled in to a depth somewhat greater than that of the T-bars 3 so that no portion of the metal frame is exposed on the top surface.

The roof structure described is of simple construction, is easy and cheap to construct, is light, and with all is very strong, inasmuch as the entire structure, including the plaster boards, forms a monolithic slab which is reinforced for its entire length and width, and is, therefore, capable of standing a very considerable load. This slab is reinforced not only by the metal mesh described, but also by the T-bars 3 and angle bars 6 which become thoroughly embedded and bonded in the cementitious material. The consequence is that the metal members can be of light cross section, and the slab of minimum thickness.

Since the plaster boards which form the bottom surface of this slab serve as centering, the usual centering for erecting roofs of this kind can be entirely dispensed with, thus making a great saving in cost of erection.

The top surface of this roof structure will be suitably water-proofed by any of the usual water proofing methods, such as by applying thereto a coating of asphaltum or the like, and can be finished in any desired way of finishing roofs of this kind, such as by providing the same with a gravel or other surface.

In case the cementitious material is such as to form a strong slab, such as cement, the members 4 need not necessarily be of a composition to bond with the cementitious material, but may be the so-called commercial "beaver board" or the like thin board.

I claim:

1. The method of making a roof of the character described including purlins which consists in laying supporting members across said purlins, laying plaster boards between said supporting members so that they rest thereon and form centering and bringing into cooperative relation with said plaster boards, means for holding adjacent transverse edges of the same substantially in alignment with each other while they serve as centering; and molding onto the plaster boards a cementitious material which bonds therewith, thereby forming a monolithic roof slab including the plaster boards, cementitious material and the means for holding adjacent transverse edges of the plaster boards in alignment.

2. The method of making a roof of the character described including purlins which consists in laying supporting members across said purlins, laying plaster boards of ordinary commercial size between said supporting members so that they rest thereon, and bringing strengthening means into such cooperative relation with the plaster boards that the boards are rendered capable of carrying the weight of a plastic mass of cementitious material without excessive deflection, the said means being adapted to form a permanent part of the finished roof; placing metal reinforcing fabric over said supporting members and in spaced relation to said plaster boards, and molding a cementitious material onto the plaster boards to a depth greater than said supporting members, whereby a monolithic roof slab is formed, comprising the plaster boards, cementitious material, metal reinforcement and said strengthening means.

3. The method of making a roof of the character described including purlins which consists in laying supporting members across said purlins, laying substantially rectangular plaster boards between said supporting members so that one pair of opposite edges of each of said boards is supported by said members, maintaining the other pair of opposite edges of each of said plaster boards in substantially aligned relation by supporting said edges from angle members extending between the supporting members, laying metal reinforcing fabric over said supporting members and in spaced relation to said plaster boards, and molding a cementitious material onto the plaster boards to a depth greater than said supporting members, whereby a monolithic roof slab is formed, comprising the plaster boards, cementitious material and metal reinforcement.

4. The method of making a roof of the character described including purlins which consists in laying on said purlins metal angle members presenting oppositely projecting flanges, laying on said flanges small metal angle members and plaster boards, the small metal angle members also presenting oppositely projecting flanges, said boards having one pair of side edges resting on the first named angle member and another pair of side edges resting on the flanges of the small metal angle members; and molding a cementitious material onto the plaster boards to bond therewith and to extend above the first named angle members, thereby forming a monolithic roof slab.

5. The method of making a roof of the character described including purlins which consists in laying supporting members across said purlins, laying plaster boards of ordinary commercial size and strengthening means between said supporting members so that they rest thereon, the strengthening means being arranged in such cooperative relation with the plaster boards that the boards are rendered capable of carrying the weight of a plastic mass of cementitious material without excessive deflection, the said means being adapted to form a permanent part of the finished roof; and molding a cementitious material onto the plaster boards to a depth greater than said supporting members, whereby a monolithic roof slab is formed, comprising the plaster boards, cementitious material and said strengthening means.

In testimony whereof I affix my signature.

HERBERT E. MARKS.